UNITED STATES PATENT OFFICE.

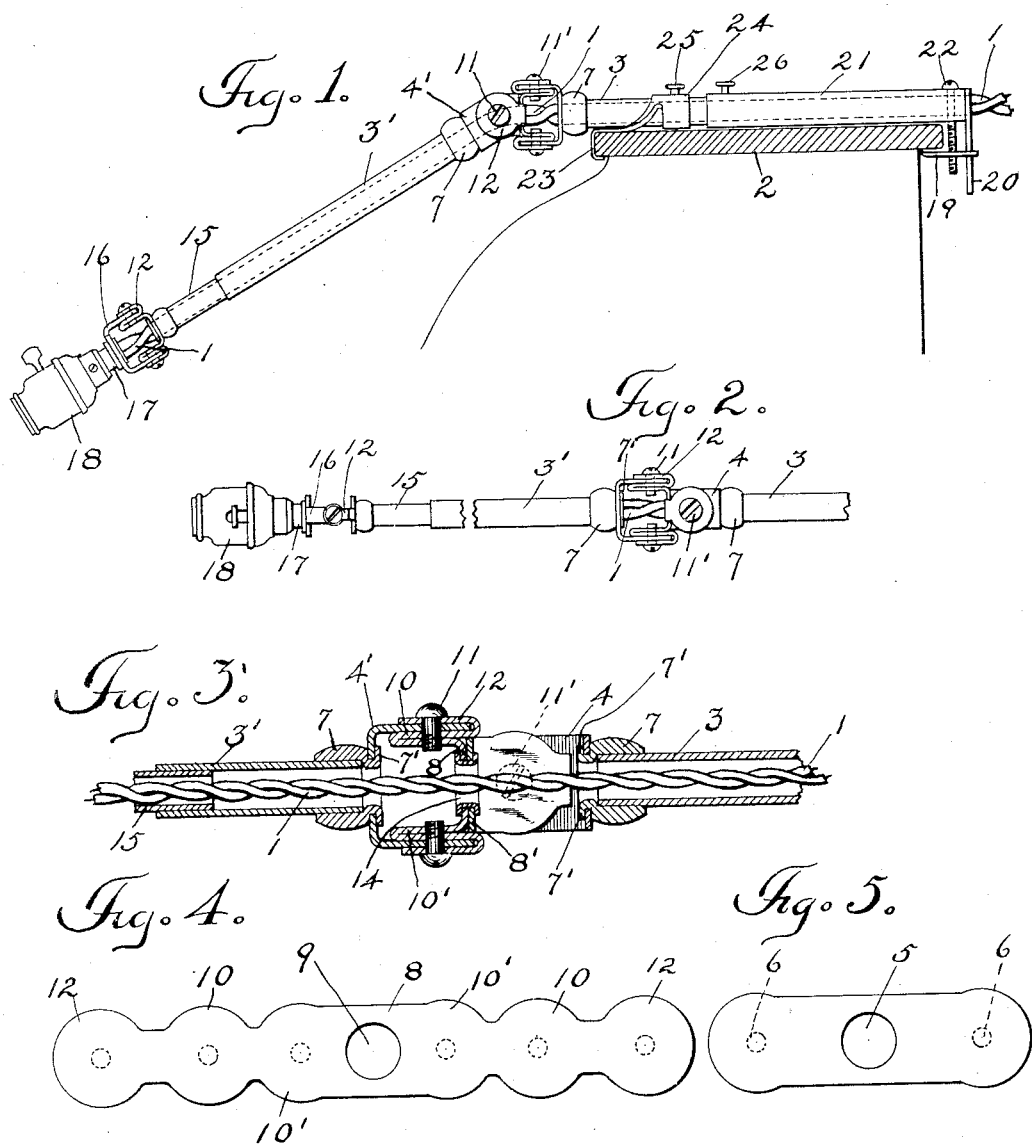

WILLIAM E. WARD, OF BAYONNE, NEW JERSEY.

FLEXIBLE JOINT FOR ELECTRIC TUBING.

No. 833,567.   Specification of Letters Patent.   Patented Oct. 16, 1906.

Application filed December 5, 1905. Serial No. 290,358.

*To all whom it may concern:*

Be it known that I, WILLIAM E. WARD, a citizen of the United States, and a resident of Bayonne, in the county of Hudson and State of New Jersey, (with post-office address Bayonne, New Jersey,) have invented certain new and useful Improvements in Flexible Joints for Electric Tubing, of which the following is a specification.

My invention relates to the construction of flexible joints between sections of tubing carrying electric conductors.

The main object of my invention is to provide a joint of such construction that the flexible electric cable or conductor may pass from one section of tube to the other without obstruction at the joint and without undue bending or injury thereof from turning of the one section of tubing on the other at the joint.

The invention may be used for joints which allow turning in one plane or direction only or for universal joints designed to allow freedom of motion in all directions.

The invention consists, further, in the novel construction of a universal joint for sections of tubing carrying electric conductors and in the details of construction hereinafter more particularly described and then specified in the claims.

While the principal object of my invention is to provide a joint either simple or universal which will be free from obstruction in the line of the axis of the tubing, a further object is to so construct the joint that the screw or pin forming the pivot-pin shall not be liable to work loose and also to so construct the joint that it shall operate as a friction-joint by which the parts shall be firmly held in any desired adjusted position.

My invention is particularly useful for the joints of bracket-fixtures carrying electric lamps or other electrical devices, but may be employed also for other forms of electric fixtures.

One part of my invention consists of the improved form of sheet-metal coupling-yoke comprising, essentially, a base perforated in line with the axis of the tube and having yoke arms or ears made by bending the sheet metal back and forth in a number of reverse laps or folds between which the arm of a coöperating yoke for the joint is received.

The invention consists, further, in the combination of a sheet-metal yoke-arm formed in three or more reverse laps or folds, a coöperating yoke-arm received between the outer lap and the two inner ones, and a screw forming the joint-pin and engaging a hole tapped in the two inner folds.

The invention also consists, broadly, of a universal joint for joining sections of electric tubing consisting of a coupling-piece comprising two pairs of yoke-arms projecting from a perforated base and disposed in planes at right angles to one another and coöperating yokes secured, respectively, to the ends of the section of tubing to be joined and having their arms individually pivoted to the arms of the coupling-piece.

The invention also consists in a coupling-piece comprising two sheet-metal yokes having perforated bases secured together base to base and having their yoke-arms disposed in planes at right angles to one another and adapted for pivoting two yokes or arms projecting from or secured to the sections of tubing to be joined.

The invention consists, further, in the special details of construction and combinations of parts, as hereinafter more particularly described and claimed.

Referring to the drawings, Figure 1 is a side elevation of an electric fixture shown as a fixture adapted for attachment to the top of a desk and comprising two sections of tube joined according to my invention. Fig. 2 is a plan of the device detached and partly broken away. Fig. 3 is a horizontal section through the universal joint joining the sections of tubing. Fig. 4 illustrates the sheet-metal blank from which one of the yokes of the coupling-piece may be made. Fig. 5 shows the sheet blank adapted for the yoke attached directly to one of the sections of tubing.

1 indicates the flexible electric cable or conductor strung through the sections of tubing 3 3', which are flexibly jointed to one another. I have for the sake of illustration shown my invention as applied to an electric bracket or fixture for attachment to a desk-top 2, the means of attachment being such as shown or of any other desired character. The tubing may be of telescopic construction. Around the ends of the sections 3 3' of the tube are fastened the perforated yokes 4 4'. Each yoke has its base perforated at 5 in line with the axis of the tube, to which it is secured, while its arms are perforated at the points indicated in dotted lines 6 of Fig. 5 for the reception of the pivot-pins of the joint. This yoke consists, preferably, of sheet metal, and it is secured in position with its opening 5 in line with the opening through the tube in any desired way—as, for instance, upon the tube may be a collar 7, having at 7' a shoulder against which the base of the yoke may rest, while the end of the collar over which the base is slipped may be bent or spun down over the base to secure it in place. The manner of fastening the yoke to the tube may be modified in any desired way without departing from my invention.

For the purpose of making a universal joint between the sections 3 3' I use a double coupling-yoke, each member of which is preferably made of sheet metal. A blank suitable for making each member of the double coupling-yoke is shown in Fig. 4. The shape of this blank when bent to form the yoke is clearly shown in the section of one member or portion of the double yoke, as seen in Fig. 3. 8 is the base of the yoke having an opening at 9, which is in line with the opening through the tube carrying the coöperating yoke 4 or 4', to which it is pivotally connected. The arm of the yoke is formed of a number of reverse folds or laps of the sheet metal, the two inner ones of which (designated at 10 10' on the blank) lie against one another and form a double thickness of metal which may be tapped for reception of the screw pivot-pin 11. The outer lap or free end 12 of the blank forms a bearing for the head of the screw-pin, and between said outer lap or laps 12 and the double thickness formed by the two inner laps or folds the arm of the coöperating yoke secured to a section of tubing is received. Said coöperating yoke-arm turns freely upon the unmutilated portion of the pivot-pin 11. The outer lap 12 forms also a bearing for the head of the pin 11. By this means it will be obvious not only that the yoke, as 4 or 4', may swing freely upon the pivot-pin without danger of turning or loosening the same in the threaded opening tapped in the double thickness, but also there will be a stiff friction-joint formed by setting up the screw 11, so that the section 3' will firmly retain any position into which it may be turned. To form a double-yoke coupling-piece the two members of which shall coöperate properly with the yokes on the ends of the sections of tubing and provide a universal joint, I may construct said double-yoke coupling-piece from two yokes, each of which may be formed as just described. The perforated bases of these yokes are fastened together base to base, but with the yoke-arms of one disposed at right angles to the arms of the other. The base of the second yoke of this compound yoke is indicated at 8', and one of the pivot-pins therefor is indicated at 11'. Their perforated bases are arranged with their openings in line, and in said opening is located a bushing or eyelet 14, which may be made of sheet metal and which may be spun or swaged to fasten the bases together by confining them in the peripheral groove in the edge of said bushing or eyelet, as clearly shown in the drawings. Other ways of constructing the compound or double coupling-yoke may be employed, and when the same is made of two separate yokes other ways of fastening such yokes together base to base may be employed without departing from my invention.

By using individual pivot-pins for the two arms of each member or portion of the double yoke and by providing a perforation or opening through the base it is obvious that the flexible conductors or cable may pass through the universal joint without obstruction. The same construction of sheet-metal yoke that is employed for one member of the double yoke in the universal joint may be employed for a joint constructed to allow flexure in one plane only. This is illustrated in Figs. 1 and 2, where the telescopic extension 15 of tube-section 3' is shown provided with such a yoke. The coöperating yoke (indicated at 16) is shown properly secured to a tubular extension 17, projecting axially from the base of an electric switch and socket 18. Said yoke 16 may be of the same construction as the yoke secured to the ends of the tubes 3 3'. The same construction could be obviously employed at any point in a system of tubing where it is desired to provide for running the electric conductors through the tube and permitting flexure at a joint between the sections of tubing in one plane. The devices shown for attachment of the apparatus to the top of a desk comprise a clip 19, made to slide upon a rod 20, depending from the end of tube 21. Said clip is operated and fixed in position by screw 22, passing through tube 21. The section 3 of the tubing slides like a section of telescopic tubing in a tube 21 and is provided with an adjustable clip 23, adapted to engage the front edge of the desk-top. Said clip is carried by a sleeve 24, sliding on section 3 and fixed in position thereon by set-screw 25. A set-screw 26 fixes the section 3 in any desired position of adjustment in the tube 21.

I do not limit myself to the use of one flexible joint, but might use two or more secured to each other back to back and having the plane of one at an angle to the plane of the other in order to secure more flexibility of the tubing.

What I claim as my invention is—

1. A universal joint for joining sections of electric tubing, consisting of a coupling-piece comprising two pairs of yoke-arms projecting from a perforated base disposed in planes at right angles to one another, and coöperating yokes secured respectively to the ends of the section of tubing to be joined and having their arms individually pivoted to the arms of the coupling-piece.

2. A universal joint for joining sections of electric tubing, comprising a coupling-piece consisting of a pair of yokes having perforated bases united base to base and having their arms disposed in planes at right angles to one another, and coöperating yokes secured respectively to the ends of the section of tubing to be joined and having their arms individually pivoted to the arms of the coupling-piece.

3. In a joint for electric tubing, a coupling-yoke consisting of sheet metal and having a perforated base, the perforation of which is in line with the axis of the tube and having yoke-arms formed of a number of reverse laps of metal the two inner ones of which form a double thickness of metal for reception of a screw forming a pivot-pin of the joint.

4. In a joint for electric tubing, a coupling-yoke of sheet metal having a perforated base and arms composed of a number of laps or folds of the metal, the two inner laps forming a double thickness of metal for reception of a screw forming a pivot-pin, a coöperating yoke-arm located between the two inner laps and the end lap and a pivot-pin tapped in the inner laps and forming a bearing for the coöperating yoke-arm.

5. In a universal joint for electric tubing, a coupling-piece consisting of a pair of sheet-metal yokes secured together base to base with their arms arranged respectively in planes at right angles to one another, and a fastening bushing or eyelet, the opening in which is in line with the axis of the tubes to be joined.

6. In a universal joint for electric tubing, a double coupling-yoke consisting of two yokes of sheet metal having their perforated bases assembled base to base and having their arms composed of one or more laps or folds of sheet metal and a fastening eyelet or bushing having a peripheral groove between whose edges the two bases are fastened.

7. In a universal joint for electric fixtures, the combination of a double perforated coupling-yoke having a central opening and pairs of yoke-arms projecting in opposite directions from a common base and coöperating perforated yokes upon the ends of the sections of fixture to be joined and having their arms pivotally connected respectively with arms of the coupling-yoke.

8. In a flexible joint for electric tubing, the combination of a perforated sheet-metal yoke secured to the end of a section of tubing and a coöperating centrally-perforated sheet-metal yoke having an arm formed of a number of reverse laps or folds of sheet metal adapted to receive an arm of the yoke secured to the tubing between them.

9. In a universal joint for electric tubing, a sheet-metal yoke an arm of which is composed of reverse folds or laps of sheet metal, a coöperating yoke-arm located between said laps and a pivot-pin consisting of a screw which is tapped into the double fold of the first-named yoke, while the other has a bearing upon another fold or lap of said yoke, as and for the purpose described.

Signed at New York, in the county of New York and State of New York, this 22d day of November, A. D. 1905.

WILLIAM E. WARD.

Witnesses:
C. F. TISCHNER, Jr.,
LILLIAN BLOND.